(12) United States Patent
Doswald et al.

(10) Patent No.: US 7,738,045 B2
(45) Date of Patent: Jun. 15, 2010

(54) FILM-MODE (3:2/2:2 PULLDOWN) DETECTOR, METHOD AND VIDEO DEVICE

(75) Inventors: Daniel Doswald, Munich (DE); Patrick Che Wa Ng, Markham (CA)

(73) Assignee: Broadcom Corporation, Irvine, CA (US)

( * ) Notice: Subject to any disclaimer, the term of this patent is extended or adjusted under 35 U.S.C. 154(b) by 1656 days.

(21) Appl. No.: 10/837,835

(22) Filed: May 3, 2004

(65) Prior Publication Data

US 2005/0243215 A1 Nov. 3, 2005

(51) Int. Cl.
*H04N 5/217* (2006.01)

(52) U.S. Cl. .................. 348/701; 348/97; 348/700

(58) Field of Classification Search ............... 348/558, 348/441, 448–449, 452, 700–701, 911, 97, 348/458–459, 722; *H04N 5/217*
See application file for complete search history.

(56) References Cited

U.S. PATENT DOCUMENTS

| | | | |
|---|---|---|---|
| 5,317,398 A | | 5/1994 | Casavant et al. |
| 6,014,182 A | | 1/2000 | Swartz |
| 6,704,055 B1 | * | 3/2004 | He et al. ............... 348/449 |
| 7,057,665 B2 | * | 6/2006 | Jung et al. ............ 348/452 |
| 7,239,353 B2 | * | 7/2007 | Lee et al. ............. 348/441 |
| 7,283,174 B2 | * | 10/2007 | Tokuhara et al. ....... 348/448 |

2003/0156301 A1 8/2003 Kempf et al.

FOREIGN PATENT DOCUMENTS

| | | |
|---|---|---|
| EP | 1198137 A1 | 4/2002 |
| EP | 1387577 A2 | 2/2004 |
| WO | WO 01/80559 A2 | 10/2001 |
| WO | WO 02/089477 A1 * | 7/2002 |

OTHER PUBLICATIONS

International Search Report from European Patent Office; International Application No. PCT/IB2005/001286; dated Aug. 4, 2005.

* cited by examiner

*Primary Examiner*—Trang U Tran
(74) *Attorney, Agent, or Firm*—McAndrews Held & Malloy, Ltd.

(57) ABSTRACT

A film mode detector detects film mode of a series of fields of video by comparing pixels in a field adjacent the current field, with corresponding pixels directly above and directly below the pixels in an adjacent field. The number of pixels in the adjacent in time to the current field having (or not having) a value approximately between values of the pixels above and below in the current field is assessed. Film mode for a current field may be detected by monitoring the assessment from field to field. Alternatively or additionally, the detector may detect film mode by assessing for each current field, whether a relatively large or relatively small number of pixels in the immediately previous field have values outside a specified distance of values of a corresponding pixel in the immediately subsequent field, for at least a portion of the immediately previous and subsequent fields. Again, film mode may be detected by monitoring this second assessment from field to field.

20 Claims, 6 Drawing Sheets

3:2 PULLDOWN

FIG. 4A

2:2 PULLDOWN

FILM-MODE (3:2/2:2 PULLDOWN) DETECTOR, METHOD AND VIDEO DEVICE

FIELD OF THE INVENTION

The present invention relates generally to video devices and more particularly to a film mode (3:2/2:2 pulldown) detection circuit.

BACKGROUND OF THE INVENTION

Analog television in North America is broadcast in accordance with the NTSC standard. The NTSC standard calls for about sixty (exactly 59.94) interlaced fields to be presented each second. Each field represents one half the lines or rows of a video frame. Fields are typically referred to as odd and even, with odd field containing odd lines of each frame, and even fields containing even lines of each frame. Thus, in one field half a frame is presented and in the next field the other half of the frame is presented. The human eye perceives the two fields as a single frame.

Most cinema films, on the other hand, are filmed at a rate of twenty-four frames per second. Accordingly, cinema films are converted for viewing on analog NTSC television using a process known as 3:2 pulldown. This conversion is more particularly illustrated in FIG. 1. As illustrated a sequence of film frames ABCDE . . . is divided into even and odd fields, and one field of every second frame is repeated. The resulting field pattern is $A_O A_E A_O B_E B_O C_E C_O C_E D_O D_E E_O E_E E_O$ . . . Thus, every second frame is presented in three fields, and every second other frame is presented for only two fields. Twenty four frames are thus converted into sixty interlaced fields.

Figure 1:
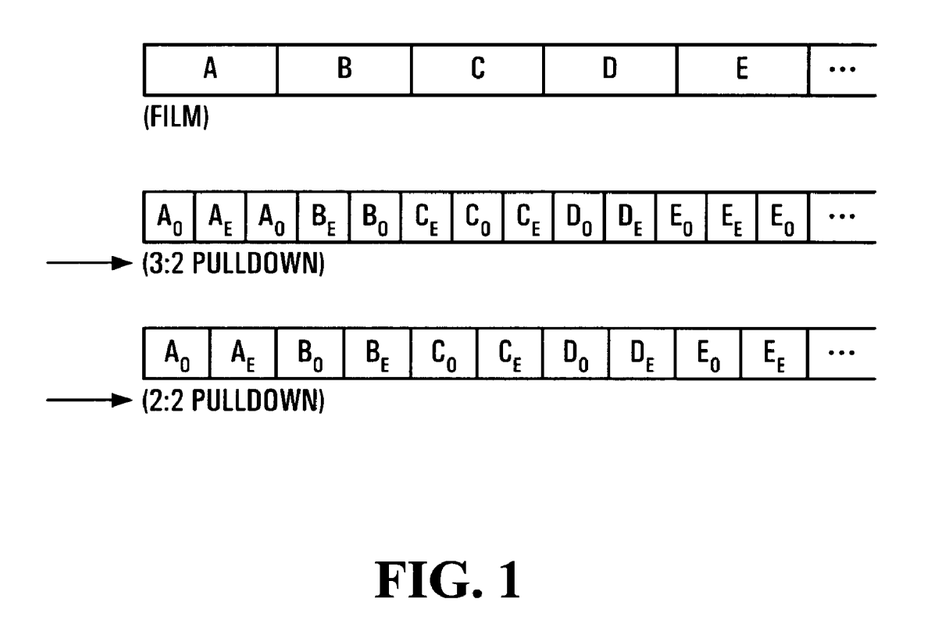

In Europe, analog television is transmit in accordance with the PAL or SECAM standards. These standards call for 50 interlaced fields per second. Cinema films are converted for viewing on analog PAL/SECAM television using a process known as 2:2 pulldown. This conversion is also illustrated in FIG. 1. As illustrated a sequence of film frames ABCDE . . . is divided into even and odd fields. Each even and odd field is shown once every second frame. The resulting field pattern is $A_O A_E B_O B_E C_O C_E D_O D_E E_O E_E$ . . . . Twenty four frames are thus converted into about fifty (i.e. forty eight) interlaced fields.

Newer television and computer displays, however no longer display interlaced video. Instead such displays display the video progressively, one line after the next. Accordingly, newer video output devices, such as for example digital versatile disk (DVD) players, computer games and the like, output video progressively, line by line.

Often video to be presented by such progressive scan devices comes from interlaced sources. For example, many DVDs still store video data as fields of MPEG (or MPEG2) data. Moreover, many such sources store the interlaced video in film mode (3:2 pulldown or 2:2 pulldown). Progressive scan devices must be able to accurately assemble progressive scan frames from the interlaced data. They must therefore be able to detect the presence of film mode, to correctly combine frames. To this end, many sources (such as DVDs) are coded with flags that are intended to indicate whether stored video is stored in film mode or not. Unfortunately, video is often poorly edited: video is cut apart and reassembled in a way that destroys the sequence. Similarly, video is often transferred or broadcast without these flags. In short, the flags cannot be relied upon.

As a result, film mode detection circuits are known. One such detection circuit calculates the sum of absolute differences between adjacent fields. If the source video is stored in film mode, the sum will follow a predictable pattern. Such detection, however, cannot distinguish easily between noise, slow movements, content that overlays interlaced and film mode material, high frequencies, and conventional interlaced content.

Other techniques include the analysis of motion vector data from field to field. Such techniques, however, are quite complex.

Accordingly, there remains a need for film mode detection circuit and method that can easily and quickly detect the presence of film mode video.

SUMMARY OF THE INVENTION

In accordance with an aspect of the present invention, a film mode detector detects film mode of a series of fields of video by comparing pixels in a field adjacent in time to the current field, with corresponding pixels directly above and directly below the pixels in an current field. The number of pixels in the adjacent field having (or not having) a value approximately between values of the pixels above and below in the current field is assessed. Film mode for a current field may be detected by monitoring the assessment from current field to current field.

Alternatively or additionally, the detector may detect film mode by assessing for each current field, whether a relatively large or relatively small number of pixels in the immediately previous field have values outside a specified distance of values of a corresponding pixel in the immediately subsequent field, for at least a portion of the immediately previous and subsequent fields. Again, film mode may be detected by monitoring this second assessment from current field to current field.

In accordance with an aspect of the present invention, a film mode detector for detecting a film mode recording of a series of fields of video, includes: a plurality of opposite field comparators each having a first input for receiving a value of a pixel in a field immediately adjacent to a current field; a second input for receiving a value of a pixel in the current field corresponding to a pixel directly above the pixel in the field immediately adjacent; and a third input for receiving a value of a pixel in the current field corresponding to a pixel directly below the pixel in the field immediately adjacent. Each comparator provides an opposite field counter output if, the first input is less than the lesser of the second input and the third input, less an offset; or the first input is greater than the greater of the second input and the third input, plus an offset. The detector further includes a plurality of opposite field counters, each one interconnected with each of the plurality of opposite field comparators, counting a number of opposite field counter outputs for a current field.

In accordance with another aspect of the invention, a film mode detector for detecting a film mode recording of a series of fields of video including at least one opposite field comparator for assessing if a pixel in a field adjacent the current field does not have a value approximately between values of pixels in the current field directly above and directly below a corresponding pixel in the adjacent field; and at least one counter connected to the at least one opposite field comparator.

In accordance with yet another aspect of the present invention, a film mode detector for detecting a film mode recording of a series of fields of video including at least one like field comparator for assessing whether a pixel in a field immediately previous to the current field are outside a specified distance of a corresponding pixel in a field immediately subsequent to the current field; and at least one counter connected to the at least one like field comparator.

Aspects of the invention may be embodied as computer readable instructions stored on a computer readable medium.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention, FIG. 1 schematically illustrates the encoding of film frames, to a sequence of interlaced film mode (3:2 pulldown and 2:2 pulldown) fields.

DETAILED DESCRIPTION

Figure 2:
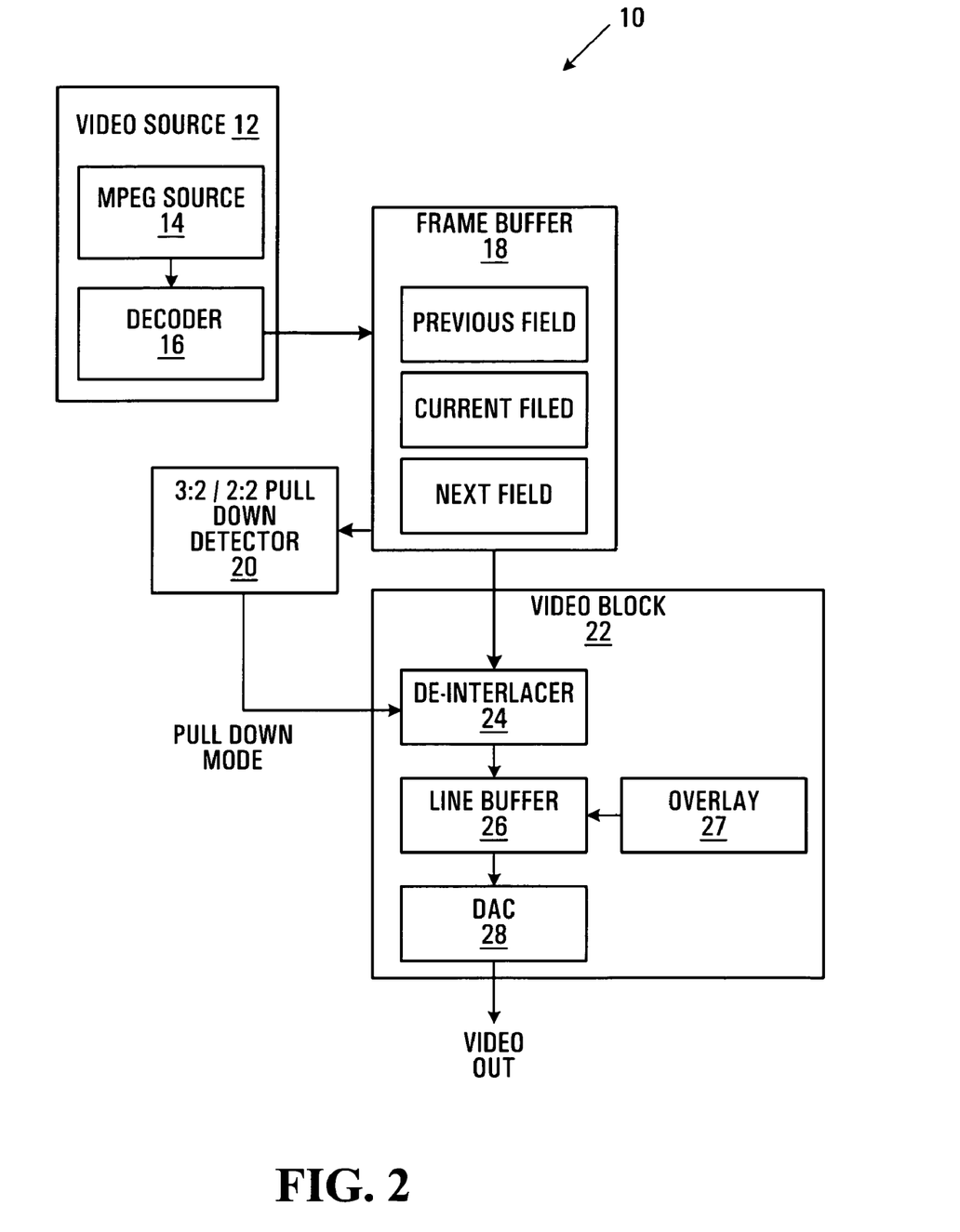
FIG. 2 is a simplified schematic block diagram of a video circuit including a film mode detector, exemplary of an embodiment of the present invention

FIG. 2 illustrates a video device 10 for generating a progressive scan video output signal. Video device 10 includes a film mode (3:2/2:2 pulldown) sequence detector 20, exemplary of embodiments of the present invention. As illustrated, video device 10 includes a video source 12 of digitized video providing a sequence of video fields to a frame buffer 18.

In the embodiment of FIG. 2 video source 12 provides decoded video stored as MPEG 1 or 2 video originating with MPEG source 14. MPEG source 14 may, for example, be a source of MPEG encoded video, and may for example be a DVD, read by an appropriate reader. MPEG source 14 could similarly be a demodulated MPEG stream carried by a satellite or cable television signal, or digital television signal. Decoder 16 decodes the digital stream into rasterized video frames or fields. For example, for non-progressive (i.e. interlaced) sources decoder 16 decodes interlaced video into odd and even fields and provides these fields to frame buffer 18.

Of course, this invention may be equally applicable to video from other sources. For example, video could be stored in other digital formats such as MPEG 4; Quicktime; or the like. Alternatively video source 12 could provide a digitized version of an analog video source.

Any audio associated with video source 12 may be separately extracted and amplified in a conventional manner, not detailed herein.

In any event, the output of video source 12 is provided as fields of rasterized video data to frame buffer 18. Film mode sequence detector 20 is interconnected with frame buffer 18; and video block 22.

As illustrated, video block 22 includes a de-interlacer 24, a line buffer 26, an overlay generator 27, and a digital to analog converter (DAC) 28. Video block 22 converts data in frame buffer 18, line by line into an analog output for display on a display such as a computer monitor, television, or the like. Data in the line to be converted by the DAC is stored within line buffer, where it may be scaled or overlayed with additional video information, in conventional ways understood by those of ordinary skill. Data provided to the line buffer 26 is provided from frame buffer 18 by de-interlacer 24. De-interlacer 24 governs the order in which lines of video data within frame buffer 18 are converted to analog video. The mode of operation of the de-interlacer 24 is controlled by film mode sequence detector 20. In an alternate embodiment, video block 22 may output digital data directly without a DAC to drive a pixel-based digital display (such as an LCD, digital light processing (DLP) display, or the like).

As noted, odd fields contain odd lines of the video frame, while even fields contain even lines of the video frame. Frame buffer 18 stores at least three fields at any given time: the fields may be considered previous, current and next fields. Preferably, frame buffer 18 operates first-in, first out: each time a new field arrives from video source 12, an old one is discarded, while previous, current and next fields are stored at the same locations frame after frame. As will become apparent, de-interlacer 24 assembles frames of progressive video to be provided to DAC 28 from current and next fields, or current and previous fields.

Decoder 16, frame buffer 18, display block 22 and film sequence detector 20 may each be formed using conventional LSI/VLSI design and production techniques appreciated by those of ordinary skill.

Figure 3:
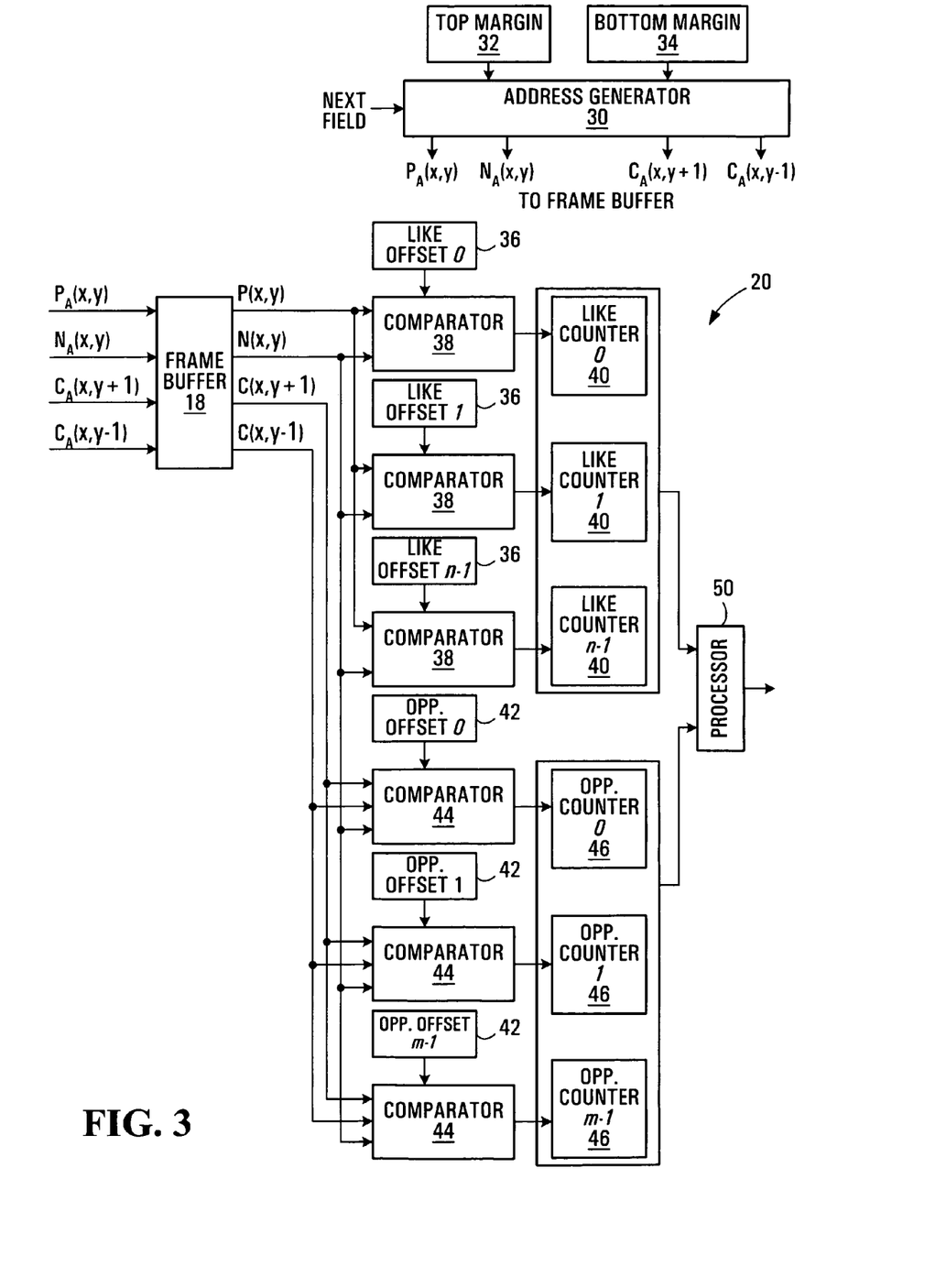
FIG. 3 is simplified schematic block diagram of the film mode detector of FIG. 2.

FIG. 3 further illustrates film mode detector 20, exemplary of embodiments of the present invention (and frame buffer 18). As illustrated, film mode detector 20 includes an address generator 30, for generating addresses of pixels within frame buffer 18 to be read/compared as described below. For each pixel having co-ordinates (x,y) within a theoretical frame, address generator 30 generates four addresses: the address within buffer 18 of pixel (x,y) within the immediately previous field; and the immediately subsequent (i.e. next) field, as well as the addresses of the pixels directly above and below the pixel (x,y) in the current field. These addresses may be represented mathematically as, $P_A(x,y)$;
$N_A(x,y)$;
$C_A(x,y+1)$; and
$C_A(x,y-1)$ Film mode detector includes two sets of comparators: like field comparators 38; and opposite field comparators 44. As illustrated, film mode generator includes n like field comparators 38, and m opposite field comparators 44. In the disclosed embodiment m=n.

Each like field comparator 38 is interconnected with an associated like offset register 36, and a like field counter 40. It takes as inputs the values of pixels at frame locations (x,y) in the previous and next field $P(x,y)$ and $N(x,y)$. Each like field comparator 38 (e.g. like_comparator$_p$) generates a signal to increment an interconnected counter, if $$abs(P(x,y)-N(x,y)) > \text{like\_offset}_p \qquad (1),$$

where abs( ) takes the absolute value of the provided argument.

Each opposite field comparator 44 is similarly interconnected with an opposite offset register 42, and an opposite field counter 46. It takes as inputs the value of the pixel at locations (x,y) of the next field $N(x,y)$ and the values of pixels one row above and one row below in the current field, $C(x,y+1)$ and $C(x,y-1)$. Each opposite field comparator 44 (e.g.

opposite_comparator$_p$) generates a signal to increment an interconnected opposite field counter, if $$N(x,y) < \min(C(x,y-1), C(x,y+1)) - \text{opposite\_offset}_p \text{ OR}$$
$$N(x,y) > \max(C(x,y-1), C(x,y+1)) + \text{opposite\_offset}_p \quad (2)$$

where min( ) and max( ) take the minimum and maximum, respectively, of the provided arguments.

In the exemplified embodiment, luminance values (Y) of the pixels are retrieved and compared. However, a person of ordinary skill will readily recognize that chrominance (U and V) or a combination of luminance and chrominance of each pixel could be used A processor 50 is in communication with like field counters 40 and opposite field counters 46 to read their values and detect a mode of operation for de-interlacer 24, based on the sequence of fields detected. Operation of processor 50 in manners exemplary of embodiments of the present invention is controlled through a series of processor executable instruction that may be loaded into instruction RAM/ROM (not specifically illustrated) associated with processor 50. The RAM/ROM may be external to processor 50 or integral therewith. Processor readable instructions may be loaded from a computer readable medium (not shown).

For each field (i.e. the $X^{th}$ field within a sequence) provided by video source 12, address generator 30 generates sets of addresses for each pixel within the current field. Sets of four addresses spanning at least a portion of each frame are generated sequentially. Registers 32 and 34 may be programmed with the upper and lower bounds (i.e. top margin and bottom margin) of the frame. Address generator 30 accordingly generates the address sets for all lines within each frame between the top margin and bottom margin, upon the arrival of a new field within buffer 18.

Thus like field counters 40 count the number of pixels within the immediately previous and immediately subsequent fields to the current $X^{th}$ field, satisfying the condition of equations (1). Opposite field counters 46 count the number of pixels within the current and immediately subsequent field satisfying the conditions of equation (2), for the $X^{th}$ current field.

In an alternate embodiment, address generator 30 need only generate addresses for a different desired region of each field. Similarly, in an alternate embodiment, opposite field comparators 44 could be used to compare current and previous fields, instead of current and next fields.

Put another way, like field counters are used to assess the number of pixels within the immediately previous field that have values outside some distance of the values of the corresponding pixel in the immediately next field. In the depicted embodiment, the distance between the pixels is measured by taking the absolute value of the difference of the pixels. A comparison of this distance to like_offset$_p$ is made. Thus, when previous and next fields are identical, the number of pixels satisfying this condition should be near zero. The offset may be chosen to allow for some noise in the fields. An optimal value of the offset will depend largely on the exact content being compared. A person of ordinary skill will readily appreciate that numerous other distance metrics could be used to assess whether or not the corresponding pixels are within or outside a specified distance of each other.

Each opposite field counter, on the other hand, assesses the number of pixels in the one field (e.g. the next) field that have values outside of some distance of a band defined by the values of the corresponding pixels above and below the pixel in an adjacent (e.g. the current) field. In the depicted embodiment, whether or not values are within this distance, is assessed by determining the number of pixels that are either i) more than +opposite_offset$_p$ away from the greater value of the pixel above and below, ii) or more than −opposite_offset$_p$ away from the lesser value of the pixel above and below. For adjacent fields belonging to the same frame, this should be met by relatively few pixels within the frame. By contrast, for current and next fields belonging to two different, subsequent frames, this condition will be met by a majority of the pixels within the frame. Again, the offset may be chosen to allow for some noise in the fields. A person of ordinary skill will also again readily appreciate that numerous other distance metrics could be used to assess whether or not the pixels is approximately within or outside the band. In alternate embodiments, a different offset for pixels above and below could be used. As noted above, previous and current or current and next fields could be used.

As will appreciated, the number of pixels in the adjacent field that have a value falling outside the band defined by the values of pixels above and below the pixel in the current field could be calculated in other ways. For example, a similar count could be obtained by determining the midpoint of the band, and counting the number of pixels having at least some distance from this midpoint. That is, a similar count could be obtained by assessing the number of pixels satisfying the condition $$\text{abs}((N(x,y) - (C(x,y+1) + C(x,y-1))/2)) > \text{opposite\_offset'} \quad (3).$$

Of course, different values of the opposite_offset' in equation (3) would need to be used in order to arrive at a count similar to the count obtained by equation (2).

In any event, different values of like_offset$_p$ and opposite_offset$_p$ in equations (1) and (2) allow fine tuning of the effectiveness of each of the counters. That is, the ideal like_offset value will be sufficiently large to allow the associated comparator to sense similarities in fields that are not identical (as for example mastered from analog versions of the content already in 3:2 pulldown format) while being sufficiently small to differentiate between fields belonging to different frames.

Each of the m opposite_offset registers and n like offset counters can be loaded by processor 50, or an external processor.

For like field counters 40, various like_offset values are used, and all counters are tested to assess whether a small or large like counter value should be attributed to value may thus vary with the content being decoded. For example, like offset less than 65 could be used for all counters, and a threshold of 10 pixels meeting equation (2) could be used to conclude a large like counter value for a field.

The m opposite offset registers and opposite counters allow processor 50 to dynamically choose the one opposite counter providing best results for a particular source. To this end, processor 50 may filter each of the opposite field counters over subsequent fields using one or more infinite impulse response filter. Based on the filtering, one of the m counters may be chosen.

Preferably, each of the m opposite counters (i.e. opposite_counter$_p$) is filtered by:

$$IIR_{max}(\text{opposite\_counter}_p, \text{field } X) = \frac{1}{4}(3 * IIR_{max}(\text{opposite\_counter}_p, \text{field } X-1) + \max_2(\text{opposite\_counter}_p(\text{field } X), \text{opposite\_counter}_p(\text{field } X-1), \text{opposite\_counter}_p(\text{field } X-2)), \quad (4)$$

where max$_2$( ) provides the second largest of the three provided arguments.

And, $$IIR_{min}(\text{opposite\_counter}_p, \text{field } X) = \frac{1}{4}(3 \cdot IIR_{max}(\text{field } X-1) + \min(\text{opposite\_counter}_p(\text{field } X), \text{opposite\_counter}_p(\text{field } X-1), \text{opposite\_counter}_p(\text{field } X-2)), \quad (5)$$

where min( ) provides the smallest of the three provided arguments.

Thereafter, the counter yielding the greatest $IIR_{max}/IIR_{min}$ ratio may be selected. To assess whether the opposite count is relatively small or large for field X, a large value may be attributed if, $$\text{opposite\_counter}_p > ((IIR_{min}(\text{opposite\_counter}_p, \text{field } X-1) + \frac{1}{3}(IIR_{max}(\text{opposite\_counter}_p, \text{field } X-1) - IIR_{min}(\text{opposite\_counter}_p, \text{field } X-1))) \quad (6)$$

Figure 4A:
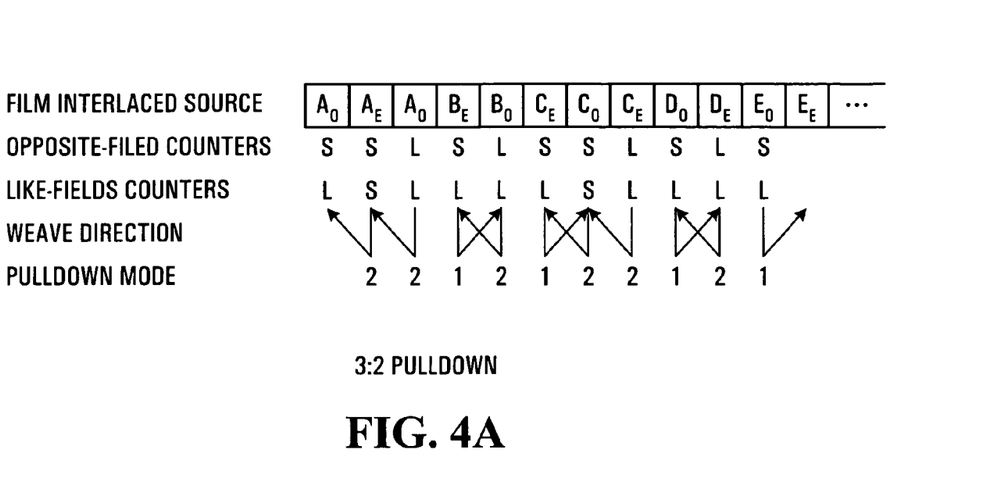
FIG. 4A illustrates counter values for exemplary fields in a film mode (3:2 pulldown) sequence of frames.
Figure 4B:
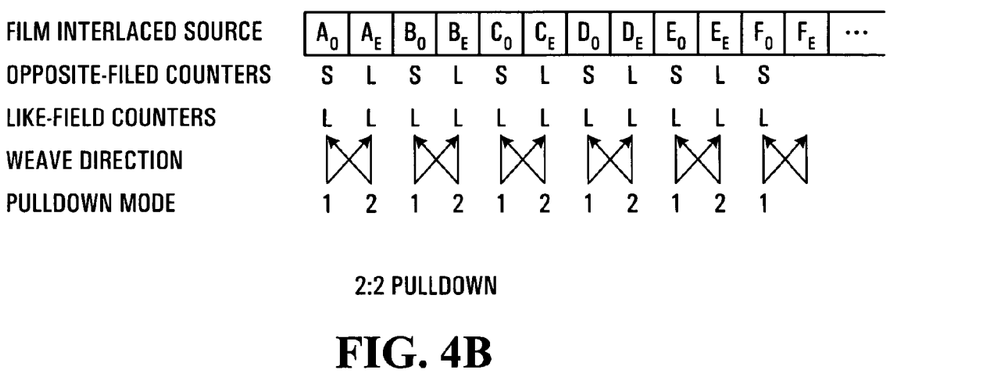
FIG. 4B illustrates counter values for exemplary fields in a film mode (2:2 pulldown) sequence of frames.

Once one of the opposite offset counters is chosen, processor 50 may estimate film/normal mode of the source, field by field. Specifically, for every field, the like field counter and opposite field counter calculates new values. Each counter value is assessed as relatively large (L) or small (S), for each field. As noted, the ideal relative values like field and opposite field counters for a 3:2 pulldown sequence are illustrated in FIG. 4A. Similarly, the ideal relative values of like field and opposite field counters for a 2:2 pulldown sequence are illustrated in FIG. 4B. The values are relative: that is large counter values (L) are assumed to be an order of magnitude larger than small (S) counter values.

Specifically, processor 50 detects three possible modes:
mode 0=pulldown mode not detected; switch to de-interlacing;
mode 1=pulldown detected, weave current field to next field to form frame; and
mode 2=pulldown detected, weave current field to previous field to form frame Processor 50 may initially attempt to detect the mode, field by field using the like field counter. Conveniently, the like field counter values typically provide discernible differences between large and small values. However, as illustrated in FIG. 4B, like field counters cannot detect 2:2 pulldown.

Figure 5:
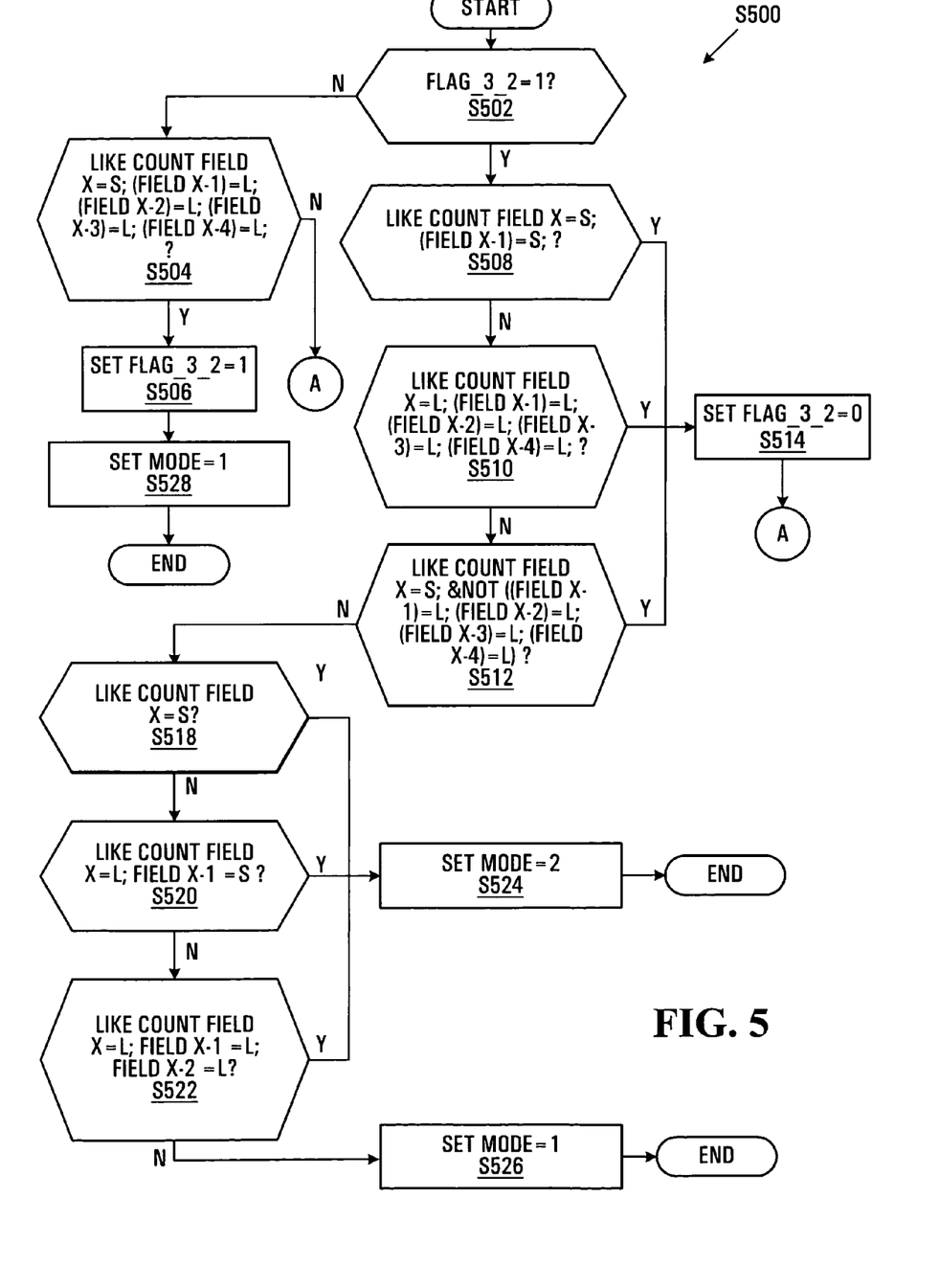
FIG. 5 is a flow chart illustrating steps performed by the film mode detector of FIG. 3, exemplary of embodiments of the present invention.
Figure 6:
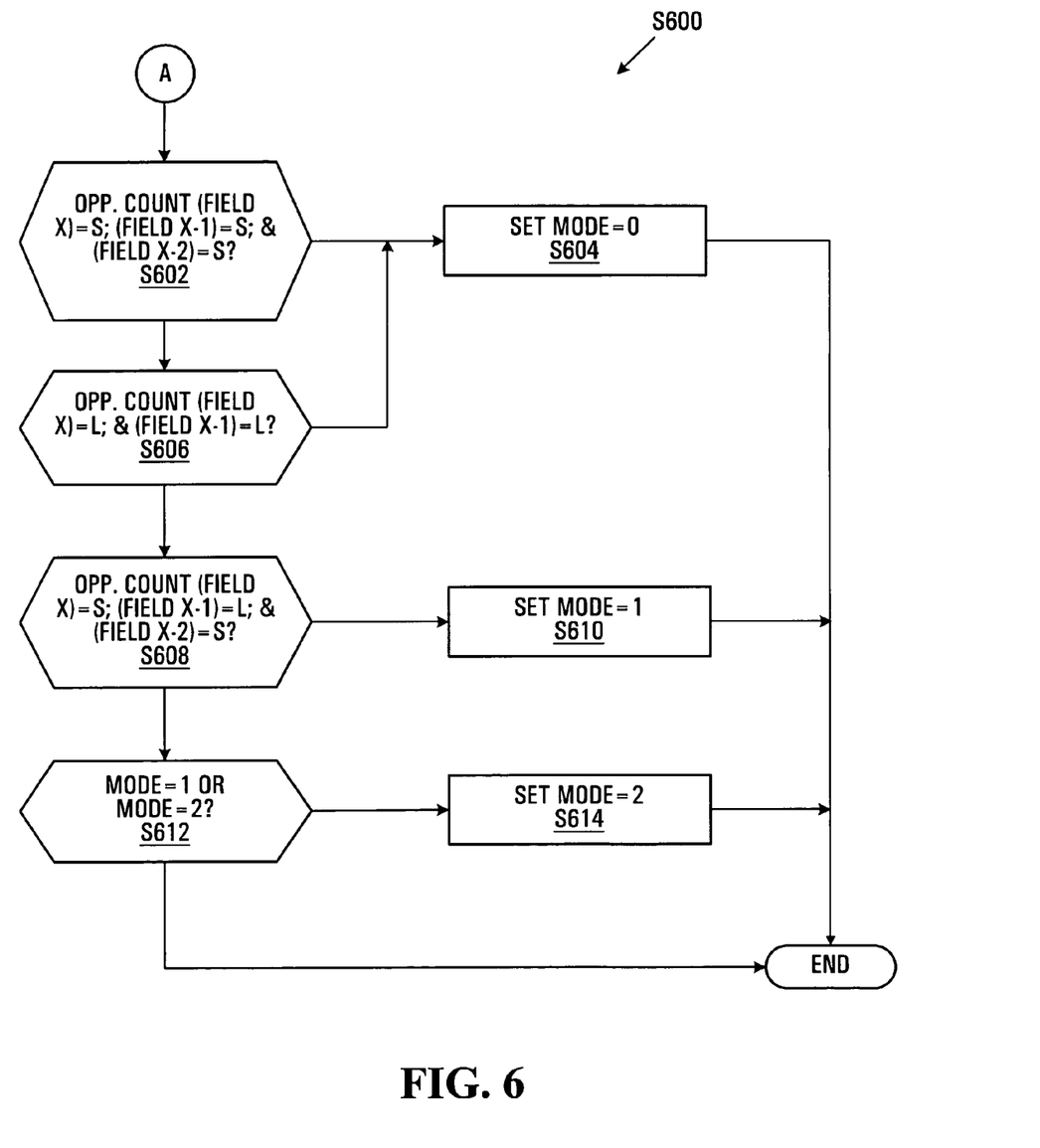
FIG. 6 is a flow chart illustrating steps performed by the film mode detector of FIG. 3, exemplary of embodiments of the present invention.

Steps S500 performed by processor 50 using like field counters to detect 3:2 pulldown modes are illustrated in FIG. 5. A flag (FLAG_3_2) is used. The status of the flag is tested in step S502. If the flag is not set, and the first small valued field of the counter follows four large valued fields as determined in step S504, the flag (FLAG_3_2) is set in S506, and mode 1 is detected in step S528. This flag is reset if the total number fields for which the like field counter is small exceeds one (step S508), or the total number fields for which the like field counter is large exceeds four (step S510); or if the total number of a field for which the like field counter is small follows three or less fields for which the like field counter value is large (step S512). If, however, the flag is set, and the total number of fields for which the like field counter is large is 0, 1 or 3, processor 50 detects mode 2 (steps S518, S520, S522). If the flag is set and the total number of fields for which the like field counter is large is 2, 4, processor 50 detects mode 1. If the flag is reset, processor 50 processor 50 attempts to detect the mode of operation using like field counters 40. To this end, processor 50 may detect the mode field by field using the opposite field counters, using steps S600 as illustrated in FIG. 6.

As illustrated, mode 0 may be detected for the $X^{th}$ frame by processor 50 in step S604, anytime the chosen opposite field counter has a small value for more than two consecutive frames (i.e. for field X; field X−1 and field X−2) (step S602); or the opposite field counter has large value for more than one consecutive fields (field X; and field X−1) (step S606). Mode 1 may be selected in step S610 after detecting a large value of the chosen opposite field counter (field X) following a single small value (field X−1) of that counter (step S608). Mode 2 may be detected if the current mode is not mode 1, and the mode for the previous (field X−1) was not mode 0 (steps S612, S614).

The opposite field counters may thus be used by processor 50 to detect 3:2 pulldown; 2:2 pulldown; and poor editing, when like field counters cannot be used to detect the mode. Conveniently, the opposite field counters may be quite sensitive to poor editing, and may be to switch modes in a single field. However, for some content, the relative values of large and small may be difficult to discern.

Of course, although detector 20 is depicted as using both opposite field (steps S600) and like field (steps S500) detection, a person of ordinary skill will readily appreciate that only one of the two forms of detection could be used. Thus, instead of performing steps S600 after performing steps S500, detector 20 could easily perform steps S500 and simply detect mode 0 after steps S514 or S504 instead of performing steps S600. Similarly, opposite field detection (steps S600) could be performed for each field without first performing steps S500. Of course, if only opposite field detection is used, buffer 18 may only need to buffer two adjacent fields, to detect film mode.

In any event, after mode detection, an indicator of the detected mode is provided to de-interlacer 24. De-interlacer 24 accordingly assembles frames for display from odd and even fields in buffer 18 for presentation on a progressive scan video display. As noted, in mode 1 de-interlacer 24 weaves the current field with the next field in buffer 18 to form the progressive frame. In mode 2, de-interlacer 24 current field with the previous field to form the frame. In mode 0, video is de-interlaced in a conventional manner. For example, adjacent fields may be weaved and/or interpolated (bobbed) together, using conventional de-interlacing techniques understood by those of ordinary skill.

Although the above embodiments have been depicted in the context of a programmable processor 50 and associated hardware comparators and counters, a person of ordinary skill will readily appreciate that methods exemplary of embodiments of the invention could readily be embodied entirely in software, and stored on a computer readable medium. Similarly, processor 50 and associated software could be replaced partially or entirely with hardware.

Of course, the above described embodiments are intended to be illustrative only and in no way limiting. The described embodiments of carrying out the invention are susceptible to many modifications of form, arrangement of parts, details and order of operation.

For example, although specific comparators and counters have been depicted to assess whether relatively small or large number of pixels meeting specified conditions are found within frames, a person of ordinary skill will readily appreciate that these assessment may be made indirectly using the complement of the exemplified conditions. For example, the like field comparators and counters could count the number of pixels not satisfying the condition of equation (1). Similarly, the opposite field comparators and counters could count the number of pixels within the bounds defined by equation (2). Counter values would, of course, be reversed. However, the same assessments (i.e. large or small number of pixels meeting or not meeting the condition of equation (1) or (2)) would be made.

The invention, rather, is intended to encompass all such modification within its scope, as defined by the claims.

What is claimed is:

1. A method of detecting film mode of a series of fields of video, said method comprising:
for each current field, assessing, in a circuit, whether a relatively large or relatively small number of pixels in a field immediately previous to said current field are outside a specified distance of a corresponding pixel in a field immediately subsequent to said current field, for at least a portion of said field immediately previous and said field immediately subsequent;
monitoring said assessing from current field to current field to detect that said series of fields of video represent video encoded in film mode, wherein assessing further comprises calculating the distance between the pixel and the corresponding pixel.

2. The method of claim 1, wherein said film mode is detected for the Xth of said current fields if said assessing assesses a relatively small number of pixels for said X.th current field;
and relatively large number of pixels for the immediately preceding four current fields.

3. The method of claim 2, wherein said film mode is detected for fields subsequent to said Xth field, until said assessing assesses a relatively large number of pixels for five or more current fields.

4. The method of claim 2, wherein said film mode is detected for fields subsequent to said Xth field until said assessing assesses a relatively small number of pixels for two or more fields.

5. The method of claim 1, further comprising maintaining for each current field a plurality of counts, each of said plurality of counts counting the number of pixels in said field immediately previous whose value is outside an associated offset of the value of a corresponding pixel in said field immediately subsequent, for at least a portion of said field immediately previous and immediately subsequent.

6. The method of claim 2, wherein said film mode is signaled by an indicator to form a current frame by weaving said current field and said immediately previous field.

7. The method of claim 2, wherein said film mode is signaled by an indicator to form a current frame by weaving said current field and said immediately subsequent field.

8. A non-transitory computer readable medium storing processor readable instructions, that when loaded at a computing device operable to decode video into a plurality of video fields, adapt said computing device to detect film mode of said series of video fields in accordance with the method of claim 1.

9. A film mode detector for detecting a film mode recording of a series of fields of video comprising:
at least one like field comparator for assessing whether a pixel in a field immediately previous to said current field is outside a specified distance of a corresponding pixel in a field immediately subsequent to said current field;
at least one counter connected to said at least one like field comparator, wherein the comparator receives the signal indicating the specified distance.

10. The detector of claim 9, further comprising a processor monitoring said at least one counter from current field to current field to detect that said fields represent video encoded in film mode.

11. The detector of claim 9, wherein the comparator calculates the distance between the pixel and the corresponding pixel.

12. The detector of claim 9, wherein the counter is incremented if the pixel and the corresponding pixel are within the specified distance, and wherein the counter is not incremented if the pixel and the corresponding pixel are not within the specified distance.

13. A video device including the film mode detector of claim 9.

14. A film mode detector for detecting a film mode recording of a series of fields of video comprising:
at least one like field comparator for assessing whether a pixel in a field immediately previous to said current field is outside a specified distance of a corresponding pixel in a field immediately subsequent to said current field;
at least one counter connected to said at least one like field comparator, wherein the comparator calculates the distance between the pixel and the corresponding pixel.

15. The detector of claim 14, further comprising a processor monitoring said at least one counter from current field to current field to detect that said fields represent video encoded in film mode.

16. The detector of claim 14, wherein the counter is incremented if the pixel and the corresponding pixel are within the specified distance, and wherein the counter is not incremented if the pixel and the corresponding pixel are not within the specified distance.

17. A video device including the film mode detector of claim 14.

18. A film mode detector for detecting a film mode recording of a series of fields of video comprising:
at least one like field comparator for assessing whether a pixel in a field immediately previous to said current field is outside a specified distance of a corresponding pixel in a field immediately subsequent to said current field;
at least one counter connected to said at least one like field comparator, wherein the comparator calculates the distance between the pixel and the corresponding pixel, wherein the counter is incremented if the pixel and the corresponding pixel are within the specified distance, and wherein the counter is not incremented if the pixel and the corresponding pixel are not within the specified distance.

19. The detector of claim 18, further comprising a processor monitoring said at least one counter from current field to current field to detect that said fields represent video encoded in film mode.

20. A video device including the film mode detector of claim 18.

* * * * *